Aug. 14, 1956 V. J. LUNDELL 2,758,435
CROP GATHERING AND CHOPPING DEVICE
Filed June 1, 1954
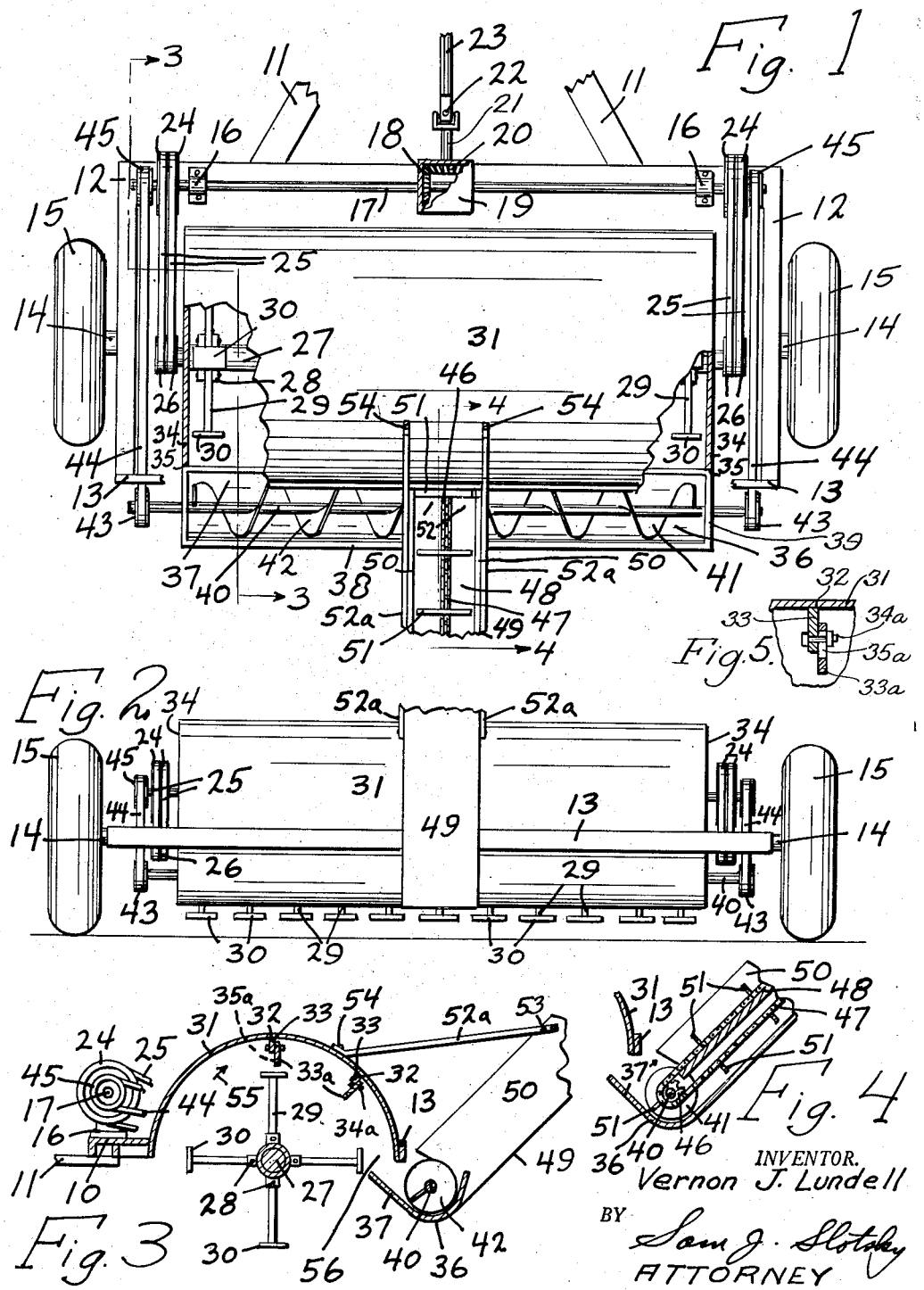
INVENTOR.
Vernon J. Lundell
BY Sam J. Slotsky
ATTORNEY

United States Patent Office 2,758,435
Patented Aug. 14, 1956

2,758,435
CROP GATHERING AND CHOPPING DEVICE

Vernon J. Lundell, Cherokee, Iowa

Application June 1, 1954, Serial No. 433,336

5 Claims. (Cl. 55—118)

My invention relates to a hay chopper and the application is a continuation-in-part of my co-pending application Serial No. 264,884, filed January 4, 1952, and now abandoned.

An object of my invention is to provide a device which will gather hay from the field, and whereby the same device will also chop the hay for the necessary feed or other purposes, and to also provide a device which can be used for auxiliary purposes such as picking up bedding for livestock.

A further object of my invention is to provide such a device in a relatively simple construction, and wherein the hay is efficiently chopped up, and conveyed to a central point and thence further conveyed into the necessary receptacle such as a wagon or the like.

A further object of my invention is to provide an arrangement which can be powered from, and drawn by a tractor.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a plan view of the hay chopper, with a portion thereof being taken in section, and with parts removed, Figure 2 is a rear view of the hay chopper, Figure 3 is a sectional view taken substantially along the lines 3—3 of Figure 1, Figure 4 is a sectional view taken substantially along the lines 4—4 of Figure 1, and Figure 5 is an enlarged detailed cross section of the adjustable bars.

My invention contemplates the provision of a hay chopper, which provides the important advantage wherein the same cutter or cylinder used to gather the hay, also chops the hay, and thence to provide means associated therewith to convey the chopped hay to the desired receptacle or location.

I have used the character 10 to designate a framework member to which are attached a pair of members 11 adapted to be attached to a tractor for drawing the unit, and I have further used the character 12 to designate further framework portions terminating in a transverse framework strap 13.

Journaled on the short shafts 14 are the wheels 15 which are adapted to transport the unit, and attached to the members 10 are the bearings 16 in which bearings is journaled the shaft 17 attached to the beveled gear 18, the beveled gear 18 being enclosed within a casing 19. Meshing with the beveled gear 18 is a further beveled gear 20 attached to a shaft 21 which is attached to the universal joint 22 which in turn is attached to the further shaft 23 which passes to the rear power take-off shaft of the tractor.

Attached to the shaft 17 are a pair of pulleys 24 at either side, over which pass the belts 25, the belts 25 passing over smaller pulleys 26, the pulleys 26 being attached to the end of the transverse shaft 27.

Pivotally attached to the ears 28, which ears are attached to the shaft 27 are the swinging bars 29 which terminate in the T-shaped portions at 30.

Enclosing the rotary members 29 is a semi-cylindrical casing 31 to which are attached at 32 the radially positioned bars 33 which extend transversely along the inner portions of the casing 31.

Attached to the bars 33 are the further transverse bars 33a which are attached thereto by means of the bolts 34a passing through slots 35a.

The casing 31 includes the end walls 34. Suitably attached as at 35 to the casing 31 is a transversely positioned conveyor chute 36 having the upwardly inclined wall 37 and the further wall 38, and journaled within the end walls 39 of this chute is a transversely positioned shaft 40 to which are attached the helical conveyor members 41 and 42, it being noted that the conveyor members 41 and 42 are pitched oppositely to each other in order to convey material inwardly toward the center of the conveyor chute, and attached to the shaft 40 are the pulleys 43 over which pass the belts 44 which belts pass over further pulleys 45 of substantially the same diameter, the pulleys 45 being attached to the shaft 17. Secured to the shaft 40 is a centrally positioned sprocket 46 over which passes a chain 47, which passes over the plate 48 mounted within the elevator member 49 having the side walls 50, and attached to the chain 47 are the conveyor paddles 51, the plate member 48 having the extending portions at 52. Bracing members 52a are secured at 53 and 54 to the casing 31 and chute 49 to support the chute in angular position, the chute extending upwardly to a substantial distance, the upper end of the chute thence terminating in a discharge opening in the usual manner, not necessarily shown herein, since such construction is well known in the art.

The device operates in the following manner. As the tractor is driven forwardly, the various drives mentioned will drive the rotary shaft 27 at a relatively high speed, which correspondingly will cause the members 29 and 30 to gather the hay in the field, whether spread loosely or in a windrow form, such hay being drawn upwardly in the direction of the arrow 55, (see Figure 3) the hay thence being directed against the bars 33a, thereby chopping up the hay, the continuing rotation of the members 29 and 30 thence causing the hay to be deposited in the opening 56, which hay thence passes to the conveyors 41 and 42 and due to the rotation of the shaft 40, providing conveyance of the material inwardly as explained, this material thence passing to the elevator member 49, whereby the paddles 51 will gather up the chopped hay at the central portion of the conveyor chute 36 and thence transport the chopped hay upwardly along the plate 48, whence the material is then deposited through the upper end of the elevator into the wagon or any other vehicle desired.

It will be noted that the length of the cut of the chopped material can be regulated by leaving the bars 33a or by removing these bars, since naturally when the bars are removed, a longer cut will be provided due to the fact that the edges of the bars 33 will be further from the ends 30 of the swinging bars 29, and conversely, when the bars 33 are in attached position, the cut will be correspondingly shorter for the same reason. By virtue of this construction, the bars 33a can be left in place or removed to provide the above result, and if desired the slots will also allow positioning of the bars 33a to regulate the length of the cut.

It should also be understood that the bars 33 could also be removed by making a detachable connection at 32, to provide a further length of cut which would be more or less the distance between the members 30 and the casing 31 itself.

Although the portions 30 will first cut the crop from the ground, the above described adjustments will serve to again cut the material during the rotary action of the hammers and according to the regulated distances described.

It will thus be noted that the machine thereby efficiently gathers the hay, chops the hay and transports the hay centrally, and thence conveys the resulting chopped hay to the necessary receptacle, in a smooth and uniform manner as the tractor is driven through the field.

It should be understood herein that slight modifications can be made without departing from the essential spirit of my invention as above stated, and it will be further seen that my invention provides the advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A hay gathering and chopping device comprising a framework, said framework including a substantially semi-cylindrical casing having its concavity facing downwardly, a transversely positioned shaft mounted in said casing, a plurality of laterally closely spaced radially positioned swinging bars pivotally attached to said shaft, means for rotating said shaft, said casing including transversely positioned bars attached therein for cooperation with said swinging bars for chopping material conveyed upwardly by said bars, said swinging bars being rotated in the same direction when contacting the crop to be gathered as the hay gathering and chopping device travels, a conveyor member attached adjacent to said casing and substantially parallel thereto, said conveyor member being positioned beneath said casing and communicating with said casing whereby chopped material from said casing will be delivered to said conveyor member.

2. A crop gathering and chopping device comprising a mobile frame, a horizontally and transversely arranged rotatable gathering and chopping device mounted on said frame, a substantially semi-cylindrical casing mounted on said frame having its axis substantially coincident with that of said gathering and chopping device, a conveyor casing of substantially U-shape in cross section mounted on said frame and extending substantially parallel to said semi-cylindrical casing, one wall of said conveyor casing being located inwardly of a wall of said semi-cylindrical casing, and outwardly of said gathering and chopping device, whereby material gathered and chopped by said gathering and chopping device will be delivered to said conveyor casing.

3. A crop gathering and chopping device comprising a mobile frame, a horizontally and transversely arranged rotatable gathering and chopping device mounted on said frame, a substantially semi-cylindrical casing mounted on said frame having its axis substantially coincident with that of said gathering and chopping device, a conveyor casing of substantially U-shape in cross section mounted on said frame and extending substantially parallel to said semi-cylindrical casing, one wall of said conveyor casing being located inwardly of a wall of said semi-cylindrical casing, and outwardly of said gathering and chopping device, whereby material gathered and chopped by said gathering and chopping device will be delivered to said conveyor casing, transversely positioned removable bars attached within said substantially semi-cylindrical casing and extending substantially parallel to the axis of said casing, further removable bars attached to said transversely positioned bars against which said material is impelled, said transversely positioned removable bars and said further removable bars providing means for regulating the length of cut of said material, said further removable bars being adjustably secured to said transversely positioned removable bars whereby said further removable bars can be adjustably positioned to vary the distance between the same and said chopping device.

4. A crop gathering and chopping device comprising a mobile frame, a horizontally and transversely arranged rotatable gathering and chopping device mounted on said frame, a substantially semi-cylindrical casing mounted on said frame having its axis substantially coincident with that of said gathering and chopping device, a conveyor casing of substantially U-shape in cross section mounted on said frame and extending substantially parallel to said semi-cylindrical casing, one wall of said conveyor casing being located inwardly of a wall of said semi-cylindrical casing, and outwardly of said gathering and chopping device, whereby material gathered and chopped by said gathering and chopping device will be delivered to said conveyor casing, transversely positioned removable bars attached within said substantially semi-cylindrical casing and extending substantially parallel to the axis of said casing, further removable bars attached to said transversely positioned bars against which said material is impelled, said transversely positioned removable bars and said further removable bars providing means for regulating the length of cut of said material, said further removable bars being adjustably secured to said transversely positioned removable bars whereby said further removable bars can be adjustably positioned to vary the distance between the same and said chopping device, said conveyor casing including a helical conveyor therein.

5. A crop gathering and chopping device comprising a mobile frame, a horizontally and transversely arranged rotatable gathering and chopping device mounted on said frame, a substantially semi-cylindrical casing mounted on said frame having its axis substantially coincident with that of said gathering and chopping device, a conveyor casing of substantially U-shaped in cross section mounted on said frame and extending substantially parallel to said semi-cylindrical casing, one wall of said conveyor casing being located inwardly of a wall of said semi-cylindrical casing, and outwardly of said gathering and chopping device, whereby material gathered and chopped by said gathering and chopping device will be delivered to said conveyor casing, said conveyor casing including a helical conveyor therein.

References Cited in the file of this patent

UNITED STATES PATENTS

| | | |
|---|---|---|
| 2,224,442 | Mankoff | Dec. 10, 1940 |
| 2,506,054 | Agee et al. | May 2, 1950 |
| 2,656,662 | Hines | Oct. 27, 1953 |

FOREIGN PATENTS

| | | |
|---|---|---|
| 18,233/24 | Australia | Mar. 16, 1925 |